United States Patent
Path

[15] 3,661,403
[45] May 9, 1972

[54] PRECISION INDEXING FIXTURE

[72] Inventor: Robert R. Path, Santa Monica, Calif.
[73] Assignee: Path Industries, Inc.
[22] Filed: Apr. 27, 1970
[21] Appl. No.: 32,152

[52] U.S. Cl..................................279/5, 74/813 L, 188/69, 269/64
[51] Int. Cl. ..................B23b 5/22, B23b 5/34, B23b 31/36
[58] Field of Search..............279/5; 74/813 R, 813 C, 813 L, 74/530; 408/71; 188/69; 269/57, 61–68

[56] References Cited

UNITED STATES PATENTS

| | | | |
|---|---|---|---|
| 2,704,672 | 3/1955 | Wiltsie et al. | 279/5 |
| 2,877,691 | 3/1959 | Shurina | 279/5 X |
| 3,380,322 | 4/1968 | Brault | 269/67 X |
| 3,451,685 | 6/1969 | Butler | 279/5 |

Primary Examiner—Andrew R. Juhasz
Assistant Examiner—Michael Kosco, Jr.
Attorney—Pastoriza & Kelly

[57] ABSTRACT

An indexing fixture for use in machine shops includes a casting mounting an indexing wheel enabling desired rotative positioning of a work held within a collet holder spindle on the fixture. The indexing wheel includes internal serrations defining a ring gear for cooperation with a plunger member mounted in a bore in the casting for movement towards the ring gear. The plunger member includes gear teeth dimensioned to mesh with a corresponding number of teeth on the ring gear, the gear teeth being tilted slightly to result in a wedging action of the plunger gear teeth with the ring gear when the plunger member is moved into meshing engagement with the ring gear. A positive locking of the plunger member to the index wheel results even through the teeth may become worn so that desired consistent indexing of a part or work can be realized.

6 Claims, 5 Drawing Figures

PATENTED MAY 9 1972  3,661,403

INVENTOR.
ROBERT R. PATH
BY
Pastoriza & Kelly,
ATTORNEYS.

PRECISION INDEXING FIXTURE

This invention relates generally to fixtures for use in machine shops and more particularly to an improved indexing fixture for precision indexing of a collet holder spindle.

BACKGROUND OF THE INVENTION

Indexing fixtures setting a desired rotative position of a collet in machining operations are well known in the art. Generally, these devices include an indexing wheel coaxial with the collet holding spindle of the fixture, the indexing wheel enabling certain predetermined rotative positions of the spindle to be repetitively established. One such type of indexing plate, for example, may have 24 holes defining 15° circumferentially spaced fixed positions to which the indexing wheel and thus the collet holding member may be locked. A suitable indexing pin is utilized for locking the index wheel in one of the predetermined positions.

There are many machining operations, however, which require considerably finer division of rotative positions of the collet holder spindle. While it is possible to provide more holes in the indexing plate, wear which takes place between the indexing pin and hole ultimately decreases the accuracy of the desired indexing.

BRIEF DESCRIPTION OF THE PRESENT INVENTION

With the foregoing in mind, the present invention provides an improved indexing fixture in which some of the foregoing limitations of known fixtures are overcome.

More particularly, the invention contemplates a casting mounting an indexing wheel to enable desired rotative positioning of a work wherein means are provided for precisely locking and indexing the wheel in a substantially greater number of possible rotative positions then have been available heretofore. In the preferred embodiment, the wheel may be indexed in 1° steps throughout 360°. The means involved constitute serrations extending annularly about the indexing wheel in the form of a ring gear. A plunger means in turn is mounted in a suitable bore in the casing for movement constrained to a direction towards the ring gear. The plunger includes a plurality of gear teeth dimensioned to mesh with a corresponding number of teeth making up the ring gear when the plunger is moved towards the ring gear. Means are provided for effecting a wedging action between the plunger means and the indexing wheel in response to movement of the plunger means towards the ring gear upon initial engagement of the gear teeth with the ring gear to lock the plunger to the casting and ring gear and thereby hold the indexing wheel in the desired rotative position.

In the preferred embodiment of the invention, the wedging action is accomplished by tilting the gear teeth carried by the plunger relative to the ring gear teeth in the indexing wheel such tat when the plunger is moved in a direction parallel to the axis of the indexing wheel, wedging action takes place directly between the plunger gear teeth and the ring gear teeth, the wedging action also thoroughly locking the plunger to the casting. Wear in the teeth is thus compensated by simply a further inward movement of the plunger, the angulation of the gear teeth providing firm engagement with those on the indexing wheel. In addition, by providing a relatively large number of gear teeth on the plunger for meshing with a corresponding number of gear teeth on the ring gear of the indexing wheel, minor errors in the tooth to tooth spacing of the teeth on the ring gear are averaged out over the number engaged so that high precision indexing is assured with reliable repeatability.

BRIEF DESCRIPTION OF THE DRAWINGS

A better understanding of the invention will be had by referring to a preferred embodiment thereof as shown in the accompanying drawings, in which.

DETAILED DESCRIPTION OF THE PREFERRED EMBODIMENT

Figure 1:
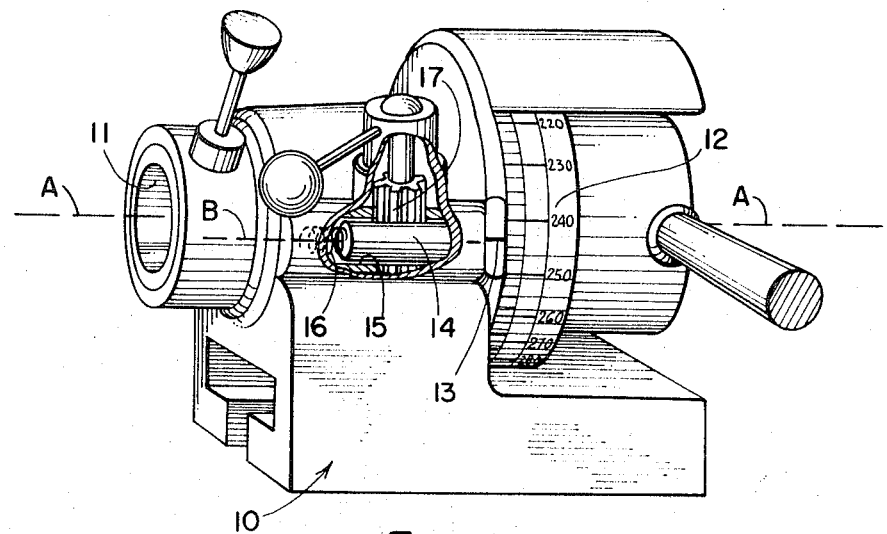
FIG. 1 is a perspective view partly cut away illustrating basic components involved in the present invention.

Referring first to FIG. 1, the indexing fixture includes a basic casting 10 mounting a collet holder spindle 11 for rotation about a given axis A—A. The casting also mounts an indexing wheel 12 coaxially with the collet holder spindle for rotation with the spindle. As shown, the indexing wheel has exposed index markings for alignment with a suitable reference mark 13 on the casting so that a desired rotative position of the spindle may be consistently repeated by reference to the index markings.

As shown in the broken away portion of the casting in FIG. 1, there is provided a plunger 14 slidable within a bore 15. This bore opens out towards the indexing wheel 12 and has an axis B parallel to and spaced from the axis A—A for the indexing wheel and spindle. A back up compression spring 16 is provided in the other end of the bore biasing the plunger 14 towards the indexing wheel 12. Controlled movement of the plunger 14 is effected by a pinion 17 all as will become clearer as the description proceeds.

Figure 2:
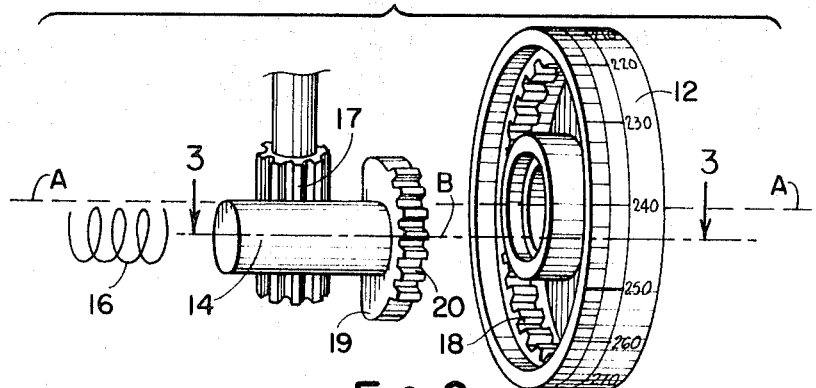
FIG. 2 is an exploded view of certain of the components illustrated in FIG. 1.

Referring now to FIG. 2, details of the indexing wheel and plunger member will be evident. As shown, the indexing wheel has annular serrations in the form of a ring gear 18 coaxial with the axis A—A, each tooth of this ring gear being straight and parallel to the axis A—A. The plunger 14, in turn, terminates in a head 19 having a plurality of serrations in the form of gear teeth 20 dimensioned to mesh with a corresponding number of gear teeth on the ring gear 18 of the indexing wheel. Movement of the plunger, as described, is constrained by the bore in the casting shown in FIG. 1 to movement along the axis B.

Figure 3:
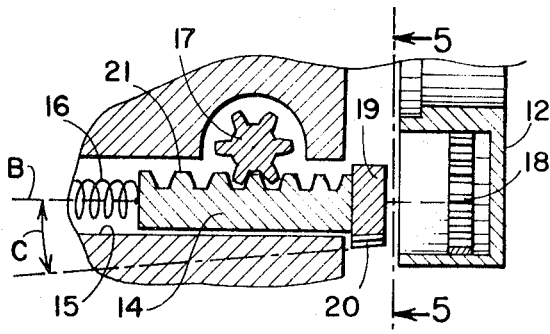
FIG. 3 is a fragmentary cross-section taken in the direction of the arrows 3—3 of FIG. 2 showing the components in a first unengaged position.

Referring to the plan fragmentary cross-section of FIG. 3, it will be noted that the far side of the plunger body 14 is provided with cut-outs defining a rack 21 cooperating with the pinion 17.

It will also be noted in FIG. 3 that the plurality of teeth 20 on the head 19 are tilted with respect to the axis B defining the direction of motion of the plunger by an angle C. Since the gear teeth on the ring gear 18 for the indexing wheel 12 are straight and parallel to the axis A—A of the indexing wheel and thus to the axis B, movement of the plunger 14 into meshing engagement with a corresponding number of ring gear teeth result in a wedging action.

Figure 4:
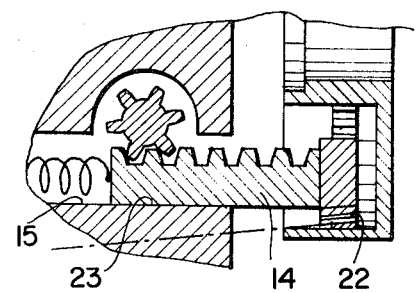
FIG. 4 is a fragmentary cross-section similar to FIG. 3 but showing the components in an engaged position; and, FIG. 5 is an end elevational view taken in the direction of the arrows 5—5 of FIG. 3 of one of the components.

Thus, referring to FIG. 4, the plunger 14 is shown in engagement with the ring gear wherein the plunger head teeth and ring gear teeth are in meshing engagement as at 22. Because of the tilting or angulation of the plunger head gear teeth, a "wedging" action takes place not only between the engaged teeth but also between the plunger 14 and side walls of the bore 15 as indicated at 23. The indexing wheel is thus thoroughly locked relative to the casting in a desired set position.

Figure 5:
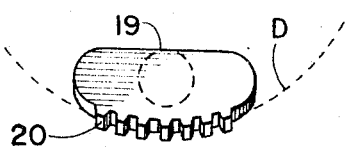

FIG. 5 illustrates in front plan view the plurality of teeth 20 on the plunger head 19. It will be noted that these teeth follow an arc D which will have a radius of curvature corresponding to the radius of the ring gear 18 in the indexing wheel.

In the embodiment of the invention described in FIGS. 1 through 5, there are provided 360 serrations in the ring gear 18 and from five to 40 serrations or gear teeth 20 in the plunger head 19. By providing a relatively large number of teeth on the plunger head 19, any tooth to tooth spacing errors in the ring gear 18 will be averaged out over the number of teeth engaged by the plunger head teeth so that very accurate indexing results.

OPERATION

In operation, any work held within a collet in turn secured within the collet holder 11 or, alternatively, any work directly secured within the collet holder 11 may be precisely and repetitively rotatively positioned with respect to the axis A—A by means of the indexing wheel 12. Thus, one degree rotative steps can be achieved in the particular embodiment described, the operator simply aligning up the desired rotative position by aligning the appropriate indexing wheel mark with the reference mark 13.

When a desired rotative position has been set, the operator will rotate the pinion 17 by means of the handle shown in FIG. 1 to thereby drive the plunger 14 towards the indexing wheel. The plunger head teeth 20 will then engage the correspondingly positioned teeth on the ring gear 18 of the indexing wheel and as a consequence of the wedging action as described, the plunger will effectively lock itself to the indexing wheel and to the side walls of the bore in the casting. The indexing wheel itself will thus be thoroughly locked against rotation relative to the casting and correspondingly, the collet holder 11 will hold the work in the rotatively set position. After prolonged use, any wear on the teeth of either the plunger head or indexing wheel will automatically be compensated for by simply a further movement of the plunger in the direction of the indexing wheel, the angulation of the plunger head teeth resulting in an ultimate firm engagement of these teeth with the correspondingly engaged teeth on the ring gear 18. Further, and as mentioned heretofore, the intermeshing of a relatively large number of teeth effectively nulls out any specific errors in tooth to tooth spacing so that very accurate indexing can be realized with excellent repeatability.

While a specific embodiment of the invention has been shown and described, the indexing fixture is not to be thought of as limited to the precise embodiment set forth for illustrative purposes.

I claim:

1. In an indexing fixture including a casting mounting an indexing wheel for desired rotative positioning of a work, means for precisely locking said indexing wheel in a desired rotative position comprising: means on said indexing wheel defining serrations extending annularly about said wheel in the form of a ring gear; a plunger means mounted in said casing for movement constrained to a direction parallel to the axis of said ring gear, said plunger means including a plurality of gear teeth dimensioned to mesh with a corresponding number of teeth making up said ring gear when said plunger is moved towards said ring gear, the teeth of said ring gear and the teeth on said plunger being tilted relative to each other in a plane including the axis of said indexing wheel and said direction of movement of said plunger means thereby defining means for effecting a wedging action between said plunger means and said indexing wheel in response to movement of said plunger means towards said ring gear upon initial engagement of said gear teeth with said ring gear to lock said plunger means to said casting and ring gear and thereby hold said indexing wheel in said desired rotative position.

2. A precision indexing fixture comprising, in combination:
   a. a casting mounting a collet holder spindle for rotation about a given axis;
   b. an indexing wheel coaxially mounted in said casting for rotation with said spindle, said indexing wheel having exposed index markings for alignment with a reference mark on said casting so that a desired rotative position of said spindle may be consistently repeated by reference to said indexing markings, said indexing wheel further having annular serrations in the form of a ring gear coaxial with said given axis, each tooth of said ring gear being straight and parallel to said given axis, said casting including a bore having an axis parallel to said given axis and opening out at one end adjacent to a portion of said ring gear; and
   c. a plunger member slidable in said bore and terminating at the open end of said bore in a head having a plurality of serrations in the form of gear teeth extending over an arc of radius of curvature corresponding to the radius of said ring gear, said teeth being tilted forwardly at a given acute angle relative to the axis of said bore whereby movement of said plunger axially in said bore towards said ring gear to mesh said gear teeth with said ring gear wedges said plunger head gear teeth against said ring gear and said plunger against side wall portions of said bore as a consequence of the tilt of said gear teeth relative to said axis of said bore to thereby lock said indexing wheel and thus said collet holder spindle in a desired rotative position in said casting even should the teeth on said ring gear and plunger head become worn.

3. A fixture according to claim 2, in which said ring gear is formed on an internal annular wall of said indexing wheel, the exterior portion of said wall including said index markings.

4. A fixture according to claim 2, in which said plunger member has cut-outs along a lateral side defining a rack; and a pinion member passing at right angles to said bore in meshing engagement with said rack so that rotation of said pinion member moves said plunger along said bore.

5. A fixture according to claim 4, including a compression spring in the end of said bore opposite its open end biasing said plunger towards said ring gear.

6. A fixture according to claim 3, in which there are provided 360 serrations evenly distributed about the interior of said side wall of said indexing wheel to define said ring gear, said head having from five to 40 serrations defining said gear teeth thereon, whereby any minor errors in tooth to tooth spacing of the teeth in said ring gear engaged by said gear teeth on said head are averaged out with respect to the final indexed position of said indexing wheel.

* * * * *